(No Model.)
C. GRIFFIN.
HOP FRAME.
No. 246,125. Patented Aug. 23, 1881.
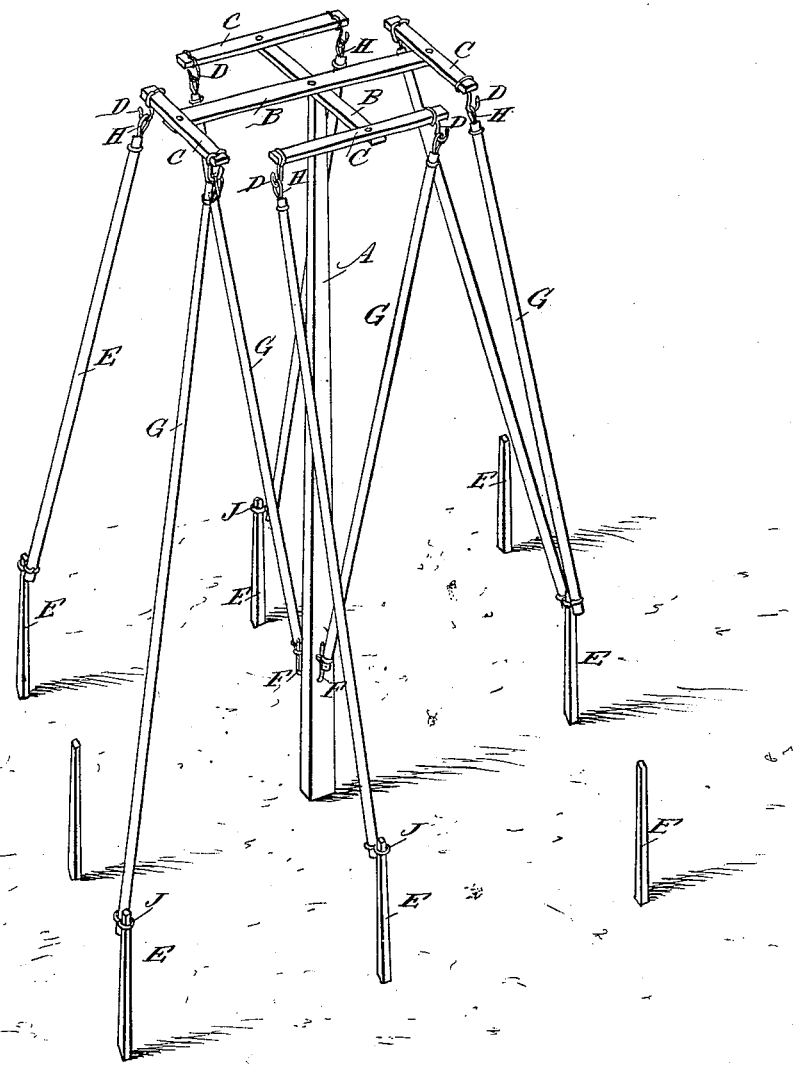
WITNESSES:
C. Naveux
C. Sedgwick
INVENTOR:
C. Griffin
BY Munn & Co.
ATTORNEYS.

UNITED STATES PATENT OFFICE.

CURTIS GRIFFIN, OF MIDDLEFIELD, NEW YORK.

HOP-FRAME.

SPECIFICATION forming part of Letters Patent No. 246,125, dated August 23, 1881.

Application filed March 18, 1881. (No model.)

*To all whom it may concern:*

Be it known that I, CURTIS GRIFFIN, of Middlefield, in the county of Otsego and State of New York, have invented a new and Improved Hop-Frame, of which the following is a specification.

The object of my invention is to provide a new and improved adjustable frame as a substitute for the poles in raising hops.

The invention consists in an upright having two crossed bars, with cross-pieces at the ends fastened to its top, which cross-pieces have hooks at the ends to receive rings at the upper ends of a series of rods having rings fitting over the tops of a series of short posts around the upright, or on hooks of the upright, attached to their lower ends. The hop-vines grow up on these rods, and the latter need only be unhooked when the crop is to be harvested.

In the accompanying drawing a perspective view of my improved hop-frame is shown.

An upright, A, is erected in the hop-field, and two crossed arms, B B, having each a cross-piece, C, at each end, are fastened to the top of this upright A, and a hook, D, is fastened to each end of these cross-pieces C C. A series of short rods or stakes, E, are driven into the ground around the upright A at a distance from the same equal to about the entire length of a crossed arm, B, so that the ends of these arms will be about midway between the stakes E and the upright A. A series of hooks, F, are attached to the upright A a distance above the ground about equal to the height of the stakes E. A series of rods, G, of such length to extend from the ends of the cross-pieces C to the tops of the stakes F, are provided at the upper ends with a ring or loop, H, and with a similar ring or loop, J, at the lower ends. It is evident that the upper ends of the rods G may be provided with hooks, and the ends of the cross-pieces C C with loops, rings, or apertures, if desired, as this modification would not affect the essential feature of my invention. Such uprights A are erected throughout the entire field in crossing rows.

The operation is as follows: In spring the upper ends of the rods G are hooked on the hooks D at the ends of the cross-pieces C C, and the loops or rings J at the lower ends of these rods are passed over the upper ends of the stakes E, or over the hooks F on the uprights, so that the rods G will be inclined toward or from the upright A, and will be inclined outward or inward from the ends of the cross-pieces C, these various positions being shown in the drawing. These rods G are arranged in such a manner that the hop-vines can grow upward on them very readily. In harvesting the hop crop all that is necessary is to unhook the poles and carry them off with the vines on them.

The within-described frame is much cheaper than the heavy poles which have been used heretofore, and it requires very much less labor in erecting it and taking it down. The vines are more exposed to the sun-rays and rain on this frame than on the ordinary poles.

Only two crossed arms B and hooks D are shown; but it is evident that more can be provided, if desired.

Having thus described my invention, I claim as new and desire to secure by Letters Patent—

In a hop-frame, the combination, with the upright A, the crossed arms B B, and the cross-pieces C C, of rods G and a series of stakes, E E, driven into the ground around the upright A, substantially as herein shown and described, and for the purpose set forth.

CURTIS GRIFFIN.

Witnesses:
ANGUS GRIFFIN,
GEORGE W. GRIFFIN.